Aug. 14, 1962 L. D. SOUBIER 3,048,890
METHOD AND APPARATUS FOR FORMING PLASTIC ARTICLES
Filed July 6, 1960 4 Sheets-Sheet 1
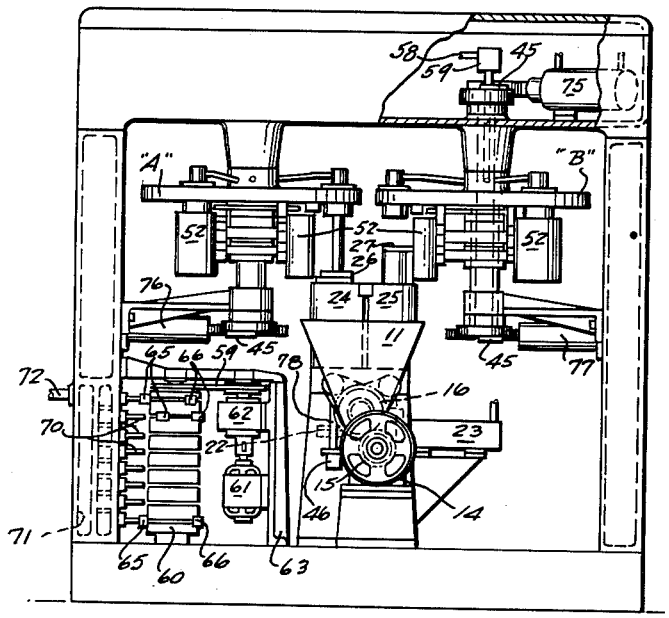
Fig. 1.
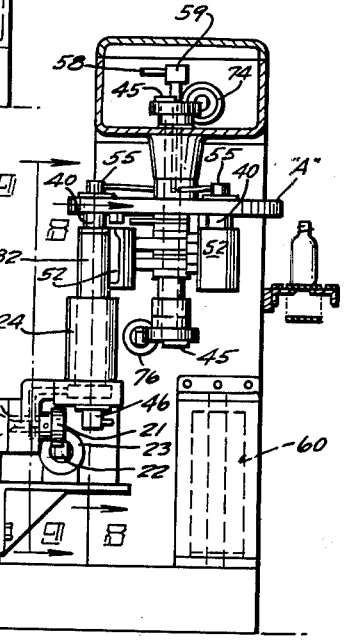
Fig. 6.
Fig. 2.
Fig. 7.
INVENTOR.
Leonard D. Soubier Aug. 14, 1962 L. D. SOUBIER 3,048,890
METHOD AND APPARATUS FOR FORMING PLASTIC ARTICLES
Filed July 6, 1960 4 Sheets-Sheet 2

INVENTOR.
Leonard D. Soubier

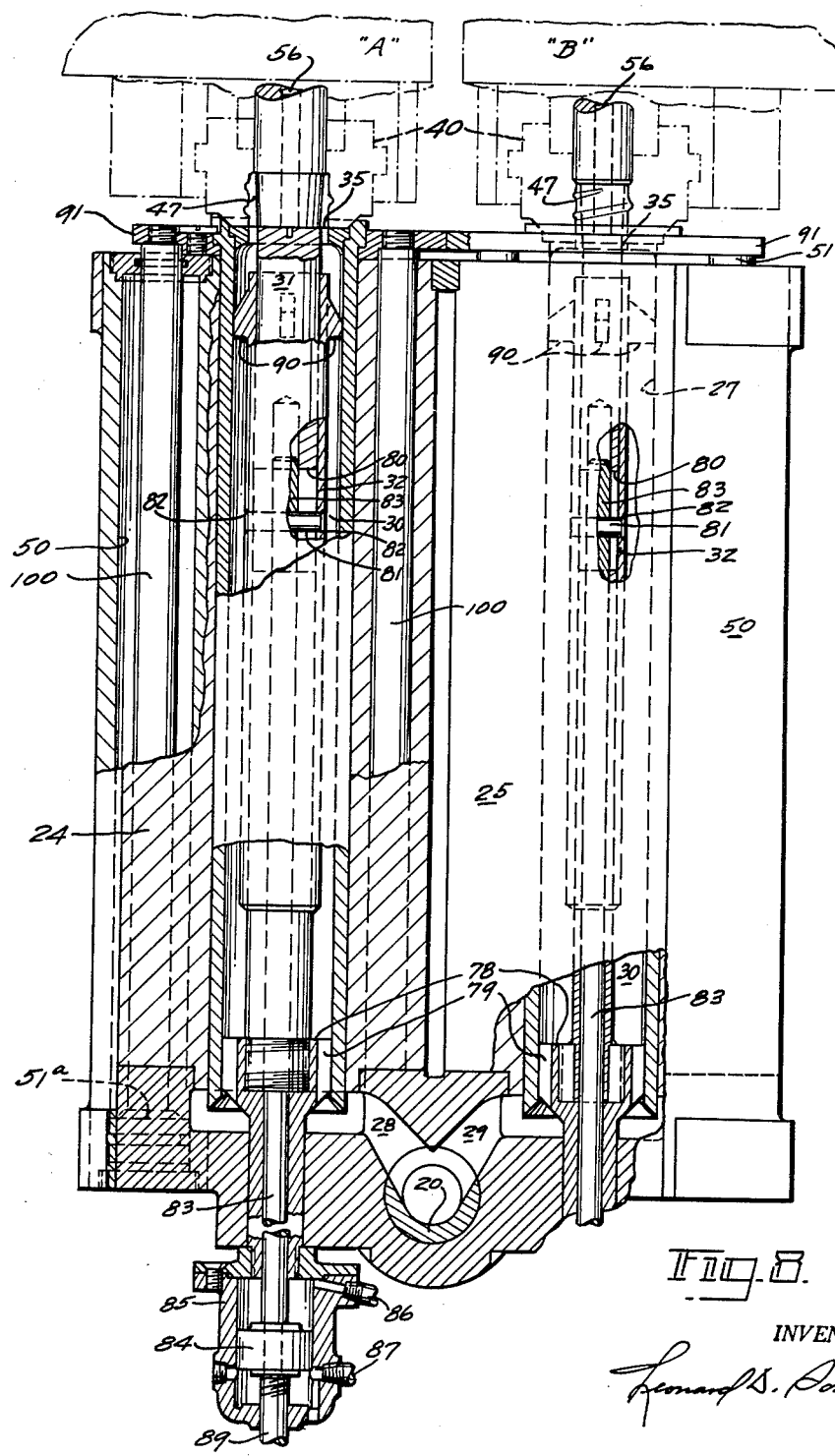

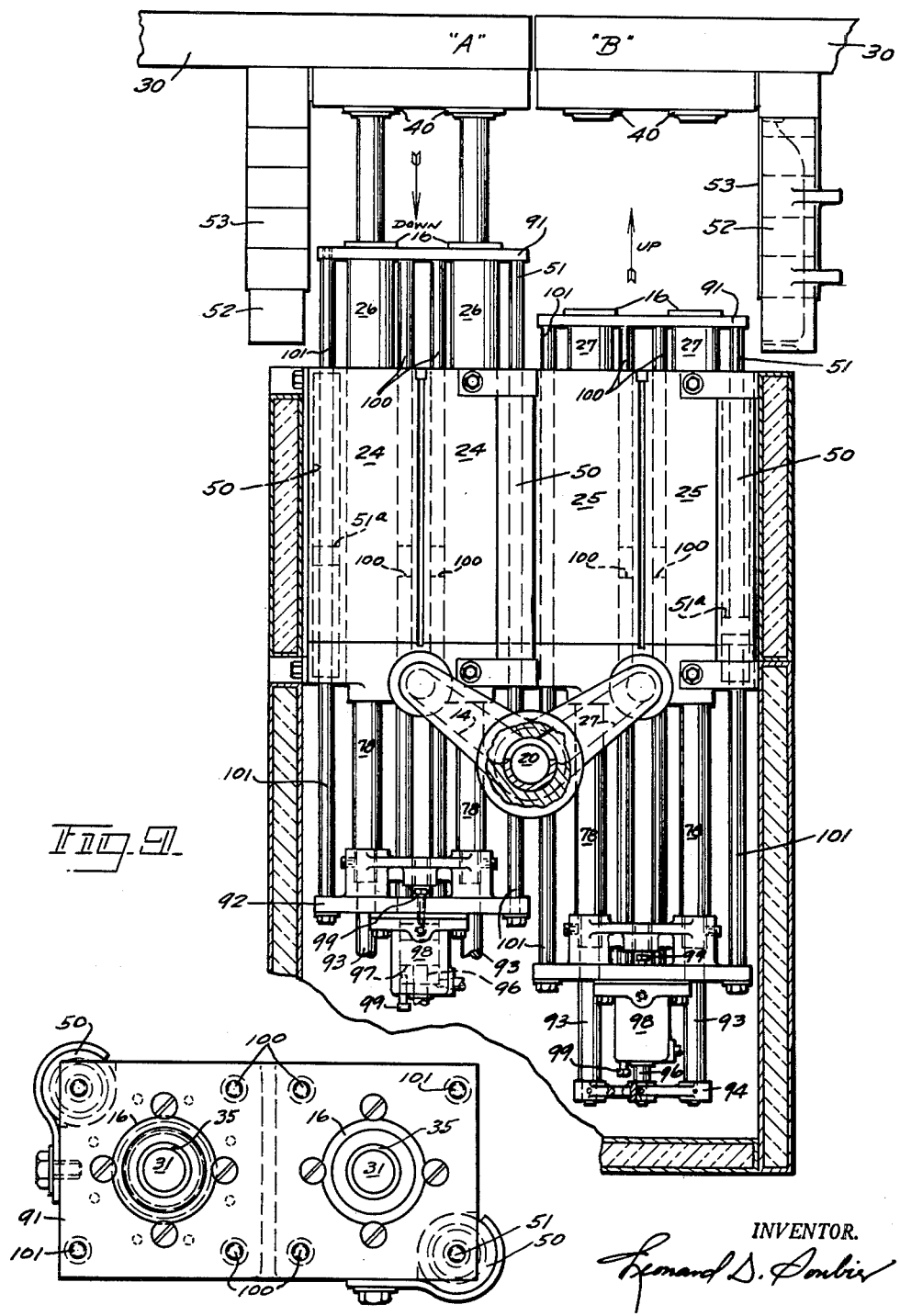

United States Patent Office 3,048,890
Patented Aug. 14, 1962

3,048,890
METHOD AND APPARATUS FOR FORMING PLASTIC ARTICLES
Leonard D. Soubier, 2542 Beaufort Road, Toledo 13, Ohio; Olive M. Soubier, executrix of said Leonard D. Soubier, deceased
Filed July 6, 1960, Ser. No. 41,135
15 Claims. (Cl. 18—5)

This invention relates to a machine for forming containers from heated plasticized material and to a particular method of making such containers.

There are a number of machines and methods now known for making such articles, but in these known mechanisms there are types of mechanisms used which can only be operated at slow cumbersome speeds and their particular organization requires exact coordination in order to obviate operating difficulties. In addition, the usual manner of extruding the material necessitates a slow operation of the mechanisms.

In this present invention not only are the mechanisms of a new type, but they are also organized in a new manner and the type of extrusion permitted thereby lends to a very high speed extrusion of the plastic material.

The operation of this new mechanism permits the application of both an internal and external pressure for the extrusion of the material and obviates any need of recirculation of the material between operations.

Therefore a primary object of this present invention is to supply an organization of mechanism wherein any recirculation of the material is unnecessary due to the fact that there will be a continuous movement of the plasticized material from the plasticizer into either one or more extrusion heads.

Another object is to provide a method and mechanism whereby the extrusion of the material may be accomplished at extremely high rates to permit increased production.

A still further object is to provide a mechanism wherein high speed operation may be maintained, but wherein the required time intervals for the individual operations may be obtained without sacrificing productive speeds.

Another object is to provide a mechanism wherein the total blowing time for any one article may be approximately the total time of producing at least two successive parisons or hollow extrusions.

Other objects will be in part apparent and in part pointed out hereinafter.

In the drawings:

FIG. 1 is a rear elevation of the machine forming the subject matter of this invention;

FIG. 2 is a side elevation of this machine;

FIG. 6 is a view of a ratchet drive device such as is used for indexing the forming tables and driving the mold opening and closing devices; and FIG. 7 is a partial section illustrating the oscillating control valve on the end of the plastic material extruder.

FIG. 8 is a partial section illustrating a control valve system used in a pair of machines of the type forming the subject matter of this invention.

FIG. 9 is a partial section of the plural nozzle mechanism and schematically illustrates the cycle of operations.

FIG. 10 is a plan view illustrating the positioning of the plural nozzles with respect to each other.

The accompanying drawings illustrate an organization of mechanisms for producing blown plastic containers at productive speeds in excess of those presently prevailing in the molding and blowing art.

In general the mechanisms comprises a pair of mold turrets arranged for horizontal rotation about separate vertical axes and with said tables in side-by-side relationship. Each mold turret carries a series of neck and blow molds, preferably three, disposed equally about the circumference of the turret and with a blow mold individual to each said neck mold.

These turrets are arranged to be indexed in alternation to bring the successive neck molds with their cooperating blow molds to a station where they can cooperate with an extruder nozzle individual to each said turret. A single extruder device is arranged between the two turrets and is so designed as to provide heated plasticized material to each turret in alternation and in this manner the alternate feeding permits one extrusion nozzle to be filling while the other is discharging its contents. As each turret is provided with one or more extruded tubes, the blow mold is closed and the turret indexed to move the enclosed tubes to the next station while bringing a new set of neck and blow molds to the extrusion station.

The blowing of the tubes in the blow molds commences immediately upon the closing of these molds and may be continued through the second and third stations of each turret, i.e., up to and including the takeout station if so required.

One of the primary objects of this invention is to provide a method and mechanism which is capable of high speed operation through the application of (a) a high speed type of extrusion, and (b) an extended and uninterrupted blowing cycle.

Figure 3:
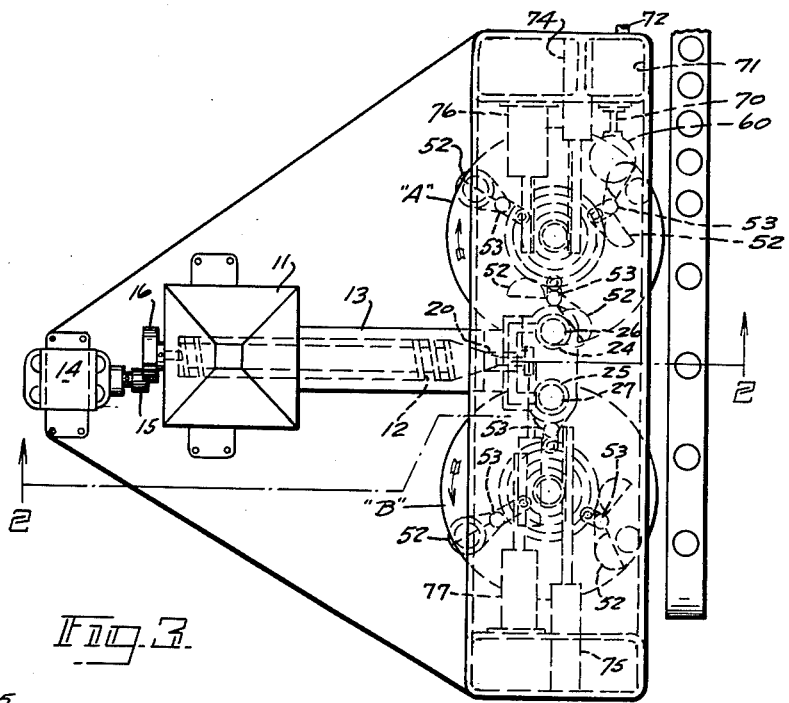
FIG. 3 is a plan view of the machine illustrating the positioning of the several units of the machine with respect to each other.

With respect to the above objectives, attention is directed to FIGS. 2 and 3 of the drawings where a plastic material extruder 10 is shown and which is provided at its outer end with an oscillating valve 20 arranged for control of the alternate feeding of the plastic material to a pair of opposed forming turrets.

Referring to FIGS. 2 and 3, there is disclosed a plasticizing or extruder device 10, comprising a hopper 11 and a plasticizing screw 12 mounted in a heater casing 13. The screw 12 is driven by a motor 14 through a pair of gears 15 and 16, and the motor is of the type wherein its speed may be controlled at will. The outer end of the extruder 10 is provided with an oscillating valve 20 which is arranged for oscillation about its longitudinal axis through the pinion 21, rack 22 and fluid motor 23. The oscillation of valve 20 about this axis provides heated plastic material alternately to the two extrusion heads 24 and 25.

Referring in particular to FIG. 3 of the drawings there is disclosed a mechanism for the extrusion of a single plastic tube from each of the extrusion nozzles 26 and 27, and the valve 20 is there positioned to provide material to the extrusion head 24, from the valve 20 through channel 28 into chamber 30 of the nozzle 26. The entry of plasticized material into chamber 30 of head 24 will cause the extrusion nozzle 26 and its associated members 31 and 32 (FIG. 5) to move upwardly as a group, thus enlarging the capacity of chamber 30. During this upward motion the position of these group members remains constant in a position in which the extrusion orifice 35 is closed.

Figure 5:
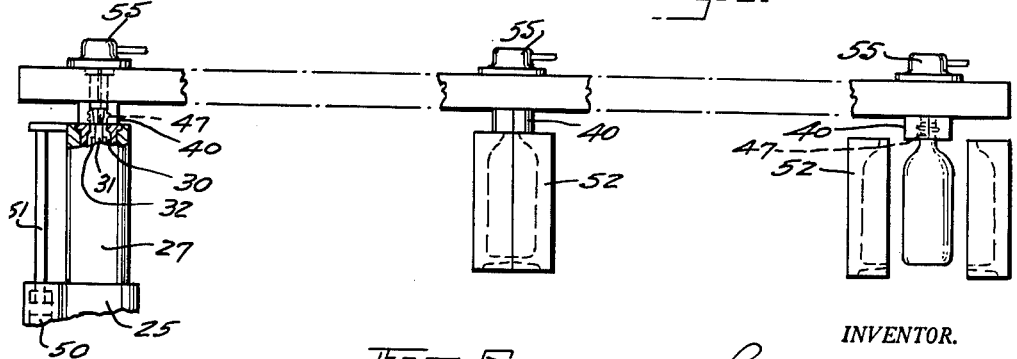
FIG. 5 is a schematic view of the cycle of the second forming table and illustrates the relationship of the two cycles to each other.

When the nozzle 26 contacts the neck mold 40 on turret "A," or just slightly before, the sleeve 32 will be moved downwardly a short distance, as illustrated in FIG. 5. As the nozzle 26 reaches the end of its up stroke the valve 20 is rotated to close off any further movement of material into chamber 30 of head 24 and to then permit entry of material from the extruder 10 into chamber 30 of the opposed head 25. As the nozzle 26 of head 24 contacts the neck mold 40, the previously moved sleeve 32 is then moved upwardly with a short stroke from cylinder 46 (FIGS. 1 and 2) to force material from chamber 30 into the neck ring cavity 47 under pressure, but the sleeve 32 does not necessarily close the orifice 35 at this time. The nozzle 26 then moves downwardly, under pressure from the cylinders 50, thus applying pressure upon the top of the plastic material in chamber 30, forcing it to extrude upwardly through the orifice 35 in tubular form and integral with the material in the neck ring cavity 47. During this downward movement the group members 30, 31, and 32 of either head 24 or 25 will always maintain the position illustrated at the lower left of FIG. 5 and this position will be maintained until the nozzle 26 has almost completed its downward stroke.

The rate of issue of the tubular form from orifice 35 depends entirely upon the rate of downward movement of the nozzles 26 and 27. Because of the fact that there is only one member of either head in motion, viz., the nozzles 26 or 27, there will therefore be no restriction upon the speed of movement of the nozzle and as a consequence, the extrusion per se can be made at any desired speed. This is contrary to the usual known mechanisms, wherein there are two moving members involved, viz., a neck mold and a cooperating pressure piston, and wherein the movements of the two members must be coordinated in order to avoid extrusion difficulties.

During the period when nozzle 26 of head 24 is moving downwardly against the closed valve 20, the nozzle 27 of head 25 is being moved upwardly by the entrance of the plastic material into its chamber 30 and also by the pressure from a piston cylinder 50. This upward movement of nozzle 27 in head 25 provides a gradually enlarging of chamber 30 for receiving the plasticized material from the extruder 10 through valve 20 and channel 29 (FIGS. 3 and 7). As the nozzle 27 of head 25 reaches its uppermost position in contact with a neck mold 40 of table "B," then the above described operation with respect to head 24, will be repeated.

With particular respect to the several mechanisms, the neck molds 40 are provided upon each turret A and B in sets of three and may be adapted for either a single or plural extrusion operation. The turrets A and B are illustrated as disposed in side-by-side horizontal relationship, but they could, if desired, be superimposed over each other and with the extruder 10 in between.

The turrets A and B are respectively arranged for horizontal indexing movement about vertical columns 48 and 49 (FIGS. 1 and 3) and in addition to the neck molds 40, will carry blow molds 52 individual to each neck mold. The indexing of turrets A and B is accomplished through a ratchet mechanism 45 (FIG. 6) which is adapted to drive these turrets in the directions indicated in FIG. 3.

The blow molds 52 will be arranged for opening and closing movement about their hinge pins 53 also mounted on the turret. The timing of the oscillation of valve 20 will be integrated with the timing for the two turrets A and B.

Figure 4:
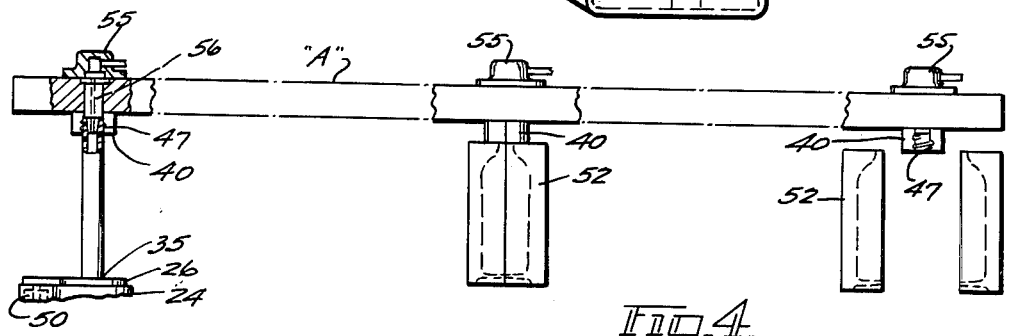
FIG. 4 is a schematic view of the cycle of operation on one of the forming tables.

From the preceding descriptive matter it should be quite apparent that as the extrusion on head 24 is completed, the extrusion on head 25 will just be starting or approximately so. Thus, with the approximate completion of the extrusion on either head the blow molds 52 close, the sleeve 32, mandrel 31, nozzle 27, and orifice 35 will have reached the position shown in FIG. 4. With actual completion of the extrusion, the members 30, 31, 32, and 27 will be in the closed position and the extruded tube will have been severed through cooperation of sleeve 32 and orifice 35.

With the completion of an extrusion and the closing of a blow mold 52, the blow head 55 will be provided with fluid under pressure through pipes 58 and swivel joints 59. This pressure will enter into the plastic tube through channel 56 of the plunger 57 (FIG. 4) and expand the tube to the confines of the blow mold 52. The turret will be indexed to the second and third stations in succession and the blowing air may be continued through blow head 55 until station three is reached. With the completion of the blowing operation, the blow mold 52 will be opened at station three (3) and the blown ware removed. Upon removal of the blown ware the next index of a turret will bring a pair of molds, i.e., a neck mold 40 and its cooperating blow mold 52 to the extrusion station for a repeat cycle.

This method may be a plural extrusion method and thus the productive capacity may again be increased over and above that of the disclosed high speed extrusion cycle and the extended ware blowing cycle. Because of the fact that there is no apparent limitation upon the speed with which the extrusion per se may be accomplished, then high speed production becomes a basic factor of this method. In addition, it should be apparent that ware of differing sizes and capacities may be produced simultaneously upon either or both turrets and without any appreciable difficulty by merely regulating and controlling the speed of extrusion of each turret with respect to the other. It should also be apparent that the group members, sleeve 32, mandrel 31, and orifice bushing 35 are interchangeable for various diameters and wall thickness of extrusions.

A timing drum 60 is provided for control of the various operations of this forming machine and is driven by a chain drive 59 through a motor 61 and speed control 62, both mounted on a support 63 (FIG. 1). A series of cams 65 and 66 is mounted in a series of grooves 68 on the drum 60 and these cams are arranged to actuate fluid control valves 70 to control flow of pressure in timed sequence from the reservoir 71. Fluid under pressure is supplied to reservoir 71 from a pressure source (not shown) through pipe 72. The several actuating motors, such as the table index motors 74 and 75, the nozzle actuating cylinders 50, the mold actuating motors 76 and 77, and the material control valve 20 actuating cylinder 23, are all under the control of the cam drum 60 and its cams 65 and 66. There is a set of cams 65 and 66 for each said fluid motor and also for control of the blowing air through pipes 58 to each turret A and B.

Each nozzle 26 and 27 is comprised of a group of component parts, viz., the extrusion nozzles 26 or 27, the mandrels 31, and sleeves 32 (FIG. 8). These parts are arranged for both separate and simultaneous movement. In order to accomplish the desired motion of these parts, each mandrel 31 is threaded at its lower end into a cross member 78 which in turn is attached to the lower end of nozzle 26 or 27 such as by welding or otherwise. This member 78 is provided with a series of circumferentially disposed openings 79 extending therethrough in order to permit movement of plasticized material from valve 20 to pass into chamber 30.

The mandrel 31 is provided near its upper end with a slot 80 which extends therethrough and along its longitudinal center line. A cross rod 81 extends through slot 80 and has a drive fit in opposed openings 82 of the sleeve 32. This cross rod 81 has a free fit in a slide rod 83 which is slidably positioned within and extends along the longitudinal axis of mandrel 31. This slide rod 83 is interconnected at its lower end to piston 84 of a cylinder 85 and is arranged for reciprocation by this vertical cylinder by fluid pressure entering through ports 86 and 87. The cylinder 85 is attached to the lower end of the member 78 and travels therewith in its vertical movement with the nozles 26 and 27. An adjustable stop screw 89 is provided in the lower end of cylinder 85 to control the down position of sleeve 32 with respect to orifice 35. The sleeve 32 is slidable along the outer surface of mandrel 31 and is provided on its upper outer surface with guide buttons 90 which act to maintain both mandrel 31 and sleeve 32 always in exact axial registration with orifice 35.

As an operating example, reference is made to FIG. 8 wherein the neck molds 40 are illustrated in dotted lines as showing the relative positions of the several parts when the nozzles are in contact with the neck molds 40. Referring in particular to the nozzle 26 in FIG. 8, the sleeve 32 is shown in open position and, assuming that the nozzle 26 is in its uppermost position, the next step would be to momentarily apply pressure beneath piston 84 through port 87 to move sleeve 32 upwardly and accelerate movement of material into the neck mold cavity 47. Then this pressure would immediately be replaced by pressure through port 86 to retract the piston 84 against the stop 89. This will leave the orifice 35 open during retraction of the nozzle 26 downwardly from the neck molds 40 to permit extrusion of a hollow tubular form from the orifice 35 and with said extrusion integral with the material in the neck mold cavity 47. When the nozzle reaches its down position, as shown in FIG. 8, the piston 84 will be again moved upwardly to close the orifice 35 and will remain in its up position until the nozzle has again moved up to the neck molds 40 for a further injection molding of a neck portion and the extrusion of a further hollow tubular form. During this above cycle the valve 20 may have port 28 closed or both of the ports 28 and 29 may be open as indicated in FIG. 8. When both are open then the nozzle 26 will work against the pressure from screw 12 as it moves down on its extrusion stroke.

The step operations of this new mechanical organization are as follows: The neck molds of table "A" have just come to rest at station 1, the extrusion nozzle is almost up in contact with this neck mold as it comes to rest. The nozzle contacts the neck mold, the center sleeve of the nozzle is retracted permitting the heated material to enter the neck mold cavity. The sleeve is then projected upwardly to set the material in said neck mold, but such upward motion is not necessarily of sufficient degree as to block the extrusion orifice. Next, the nozzle, the center mandrel and sleeve move downwardly as a unit while maintaining their respective open positions with respect to the orifice, thus forcing material out of the orifice in hollow form, but without stretching this form unless the speed of movement of the nozzle is sufficiently greater than the normal rate of extrusion to permit same. The rate of downward movement of the nozzle may be extremely rapid due to the fact that the extrusion of the material is directly dependent upon said movement, thus giving a physical condition at the orifice entirely different from that found in normal extrusion procedure. As the upper face of the nozzle approaches the horizontal plane in alignment with the bottom surface of the blow mold, said blow mold has reached a position in its closing motion which is just short of interference with said nozzle. In this way the blow mold may be fully closed around the extruded hollow tube prior to the nozzle actually reaching the end of its down stroke.

Simultaneous with the closing of the blow mold the center sleeve moves upwardly to concurrently close the orifice and sever the extrusion from the nozzle. Also simultaneous with said mold closing, the table "A" will index and air will be admitted into the enclosed hollow tube to expand same to the confines of the mold. This blowing may then be continuous to and through station 2 and into a portion of its period at station 3 if desired. While this blowing is occurring at station 2, the next parison or hollow tubular form is being extruded at station 1, and the previously blown article is being removed at station 3, thus presenting a triple overlap operation.

There is a further overlap feature in this mechanism, viz., while the nozzle at station 1 of table "A" is moving downwardly, the nozzle at station 1 on table "B" is moving upwardly and a neck mold of table "B" is moving into station 1. Tables "A" and "B" may be in the same horizontal plane. While the nozzle of the table "B" is moving up, the main valve "C" of the plasticizer is open, permitting heated plasticized material to move into the inside of the nozzle, thereby filling same preparatory to extruding a hollow tubular form therefrom. When the nozzle of table "B" reaches its uppermost position, the valve "C" will reverse, closing off this nozzle and opening up the nozzle of table "A," thus refilling it for its next operation. Both of these nozzles may be moved upwardly by the plastic material entering thereinto, but their total movements will be under control of a cylinder individual thereto and both under cam controls individual thereto.

It is also contemplated in this present invention to simultaneously form a plurality of articles in each molding station or unit and the mechanism for producing the required plural extrusions is illustrated in FIGS. 9 and 10. In this particular arrangement of the mechanisms the nozzles 26 and 27 of each respective extrusion head 24 and 25, will be joined together at their upper ends by plate 91 while their lower ends are joined by the span member 92 which in turn is attached to the lower ends of the mandrel supports 78 (FIGS. 8 and 9).

The rods 93 for operating the sleeves 32 are interconnected at their lower ends by the cross members 94 which are connected to the piston rods 96 of the pistons 97 in each cylinder 98. Adjustable stop screws 99 are provided in each end of the cylinders 98 to regulate the upper and lower positions of the sleeves 32 during the pressure actuation, the closing and the severing operations at each orifice 35.

Guide rods 100 assist in maintaining the nozzles 26 and 27 in vertical alignment during their reciprocation. The reciprocation of the nozzles is provided through cylinder 50, its piston rod 51, and piston 51a. The rods 101 interconnect the nozzle plate 90 and the lower span member 91.

In the operation of this plural nozzle mechanism it is contemplated that the valve 20 may remain continuously open to both of the chambers 30 of both extrusion heads 24 and 25, and that the pressure from the extruder screw 12 may be continuous in its application of pressure upon the plastic material issuing therefrom and within the heads 24 and 25. The actuation of each pair of nozzles 26 and 27, of each head 24 and 25, and of each pair of sleeves 32 are all under control of the timer 60 and its several valves 70.

Thus one pair of nozzles 26 and 27 may be retained in their down position until the other pair has moved through a great portion of their down stroke before the other pair of nozzles starts their upward stroke. Variations of this timing may be used to suit any operating condition. This will permit the continuous extrusion of plasticized material from the extruder under pressure from screw 12 and will regulate and control the pressures upon the material within each of the extrusion heads 24 and 25.

With this control of the nozzles of FIGS. 8 and 9, the pressure provided by the extruder screw 12 may be opposed by the pressure generated by the downward movement of the nozzles 26 and 27. Thus, there are really three, or a plurality of pressures and sources thereof, found involved in forming a hollow blank or parison; viz., the pressure generated by reciprocation of the sleeves 32 interiorly of the mass of material in chambers 30, the external pressure applied to the top of the mass of material in chambers 30 by the down stroke of the nozzles 26 and 27, and the continuous pressure from screw 12 of the extruder.

It is to be understood that valve 20 may, if so desired, be operated as an intermittently opening and closing valve for feeding the extrusion heads 24 and 25 in alternation or it may be retained in continuous open position to simultaneously feed material to both of the heads 24 and 25.

From the immediately above descriptive material it should be apparent that there is no stoppage of the flow of material from the plasticizer and therefore no need for providing a recirculation path for the material. In addition it should be noted that the second overlap feature is the fact that there is a continuous extrusion of material issuing from the extruder, but from successive orifices.

Thus, on each table there is an overlap of forming operations and as between the two tables there is also an overlap of forming operations. Also, it should be noted that the actual blowing cycle on each table is and can be of almost any desired length and because of this, the only operating limitation will be the rate of tubular extrusion of the material from each successive nozzle.

Further, the length and diameter of the ware being simultaneously produced on each machine may differ from each other within reasonable limits and two tubes may be simultaneously extruded from each nozzle.

A ware takeout device can be adapted to take blown ware from each table in succession and deposit same on the ware conveyor.

In addition to the preceding it is also contemplated that the plastic material extruder and control valve system here disclosed, could also be used in a pair of machines adapted to operate in accordance with any of the presently known systems, i.e., the system wherein the neck molds move to and from the extruder nozzle to form a tubular extrusion from which a bottle may be blown.

It should also be understood that the valve 20 may open continuously to both heads and that the vertical movement of the nozzles may be utilized in place of the oscillation of the valve 20.

Modifications may be resorted to within the spirit and scope of the appended claims.

What I claim is:

1. The method of producing hollow plastic articles from heated plasticized material, said material being normally moved to and through vertically disposed accumulating cavities having communication (1) with a plasticizing source of supply of said material under a plasticizing pressure and (2) each cavity provided with an annular extrusion orifice, the steps of said method including moving said plasticized material under said plasticizing pressure from said source of supply alternately into said cavities under the pressure of the plasticizing source, moving the orifices of each said cavity alternately and successively into and out of contact with a plurality of successively presented neck forming molds with said orifices being opened at said contact, applying a separate pressure from within each said cavity to the material therein when each surface is in contact with a neck mold to force a portion thereof into each said successive neck mold in alternation to form a finally shaped neck portion therein, causing relative motion as between the said neck molds and said orifices and simultaneously ensmalling said cavities, said relative motion in one direction acting to extrude the material from said cavities through said orifices in unconfined hollow tubular form of predetermined length integral with and suspended from said formed neck portions, confining the alternately suspended tubular forms in a blow mold prior to the completion of the extrusion and while concurrently completing said extrusion and blowing said hollow tubular forms to final shape in the blow molds.

2. The method of producing blown hollow plastic articles from heated plasticized material, said material being normally moved to and through an accumulating cavity having communication (1) with a plasticizing source of supply of said material under a plasticizing pressure and (2) with an annular extrusion orifice from which the said material issues in tubular form under an extrusion pressure, the steps of said method including moving the plasticized material from the source of supply into said cavity under the pressure of the plasticizing source, moving said extrusion orifice into contact with a neck forming mold and opening said orifice, applying a separate pressure from within said cavity to the material therein to force a portion thereof through said orifice into said neck mold, causing relative movement as between said neck mold and said open orifice while applying a further separate pressure from without the cavity to the material within said cavity to ensmall said cavity and cause same to issue from said orifice in an unconfined tubular form, said unconfined tubular form having a predetermined length integral with and suspended from said neck portion, confining said suspended tubular form in a blow mold prior to the completion of the extrusion of said length of tube while concurrently completing the extrusion and blowing the confined tube to final shape in said blow mold.

3. The method of forming hollow plastic articles from heated plastic material, said method including the provision of a source of heated plasticized material, moving a quantity of said plasticized material from said source into a chamber having a normally closed extrusion orifice, increasing the capacity of said chamber while moving said material into said chamber, concurrently segregating the material in said chamber from said material source and opening said chamber orifice, applying a separate pressure internally of said segregated material to extrude a portion thereof into a neck mold superimposed upon said orifice, causing relative movement as between said neck mold and said orifice and ensmalling said cavity to thereby apply a further separate external pressure upon said segregated material, said external pressure causing said segregated material to issue from said orifice in an unconfined hollow tubular length integral with the material in said neck mold, enclosing a portion of said extruded length in a blow mold prior to the ending of said extrusion, the closing of said blow mold sealing the said extruded length of said hollow tube, simultaneously closing said orifice and severing said extruded length from the segregated material and ending said segregation.

4. In a method of making plastic articles from heated plasticized material, said material being normally moved to and through a cavity having communication with both a source of supply of said material and with an extrusion orifice, said method including the steps of subjecting the plasticized material to a pressure to move said material from said source into said cavity, a neck forming mold positioned on said orifice, applying a separate pressure internally of the material within said cavity to force a portion thereof into said neck forming mold, applying a further separate and different external pressure upon the material in said cavity to move a measured quantity thereof out of said orifice, the application of said external pressure causing relative motion as between said neck mold and orifice, said measured quantity of material being integral with the material in said neck forming mold and the sources of said pressures and the pressures therefrom differing from each other.

5. In a method of making plastic articles from heated plasticized material, said material being normally moved to and through a cavity having communication with both a source of supply of said material and with an extrusion orifice, said method including the steps of subjecting the plasticized material to a pressure to move said material from said source into said cavity, a neck forming mold positioned on said orifice, applying a separate internal pressure to the material within said cavity to force a portion thereof into a neck forming mold, applying a further separate external pressure upon the material in said cavity to extrude a measured quantity thereof out of said orifice, the application of said external pressure causing relative motion as between said mold and orifice, said measured extrusion being integral with said molded material, the sources of said pressures and the pressures therefrom differing from each other and said pressures being applied in determined sequence.

6. The method of producing molded plastic articles from heated plasticized material wherein measured charges of said material are successively fed to and from an extrusion head through the successive application of pressure originating from a plurality of different sources thereof, said method including the steps of applying pressure from one of said sources to move a measured charge of said plasticized material into said head, applying a further one of said pressures from another of said sources internally of the mass of material within said head to form a finished end portion integral with said measured charge and continuing the application of at least one of said plurality of pressures to move the remainder of said measured charge from said head.

7. The method of producing molded plastic articles from heated plasticized material wherein measured charges of said material are successively fed to and from an extrusion head through the successive application of pressure originating from a plurality of different sources thereof, said method including the steps of applying pressure from one of said sources to move a measured charge of said plastimized material into said head, applying pressure from a second of said sources to the measured charge within said head to form a finished end portion integral with said charge and continuing the application of pressure from a third source to move said finished portion and a measured amount of said charge from said head.

8. The method of producing molded plastic articles from heated plasticized material wherein measured charges of said material are successively fed to and from an extrusion head through the successive application of pressure originating from a plurality of different sources, said method including the steps of applying one of said pressures to move a measured charge of said plasticized material into said head, applying a second of said pressures internally of said measured charge to form a finished end portion thereon and integral with said charge, continuing the application of a final one of said pressures to issue an unconfined length of said measured charge in tubular form and integral with said finished end portion from said head to a further working position and expanding said tubular form into a hollow article at said station.

9. The method of producing molded plastic articles from heated plasticized material wherein measured charges of said material are successively fed to and from an extrusion head through the successive application of pressure originating from a plurality of different sources, said method including the steps of continuously applying pressure from the plasticizing source to the plasticized material to continuously move same into the receiving chambers of the plural extrusion heads, each said head having a plurality of extrusion orifices arranged for molding cooperation with plural neck forming molds, applying a pressure from a source internally of the material within each filled head to form finished neck portions in said neck molds, said finished portions being integral with the material in the extrusion heads, applying pressure from an external source and in opposition to said continuously applied pressure to cause said material to issue from one of said orifices of said receiving chambers in unconfined hollow tubular form integral with said finished portions, simultaneously closing said orifice and severing the extruded hollow forms from the material in said receiving chambers while forming the further finished neck portion at a different orifice.

10. In an apparatus for forming hollow plastic articles from heated plasticized material, said apparatus comprising in combination, a material plasticizing device adapted to continuously plasticize and extrude material under pressure and in workable form, a material distributing and control valve at the extrusion end of said extruder, said valve adapted to receive and alternately feed the material to dispensing chambers disposed upon opposite sides of the said valve, each said chamber provided with a reciprocable nozzle and forming a mold charging station, mold carrying turrets disposed above each said station and arranged to support and move a series of molding units in succession to each said station, each said mold unit comprising a neck mold, a blow mold, a neck forming plunger and a blow head, said neck molds and said nozzles arranged to cooperate at each said charging station in alternation to form finished neck portions, means to move said nozzles away from said neck molds thereby forming extruded hollow tubular body portions of said workable material pendant from said neck portions, means to actuate said valve, means on each said turret to close said blow molds about said pendant tubular bodies, means to expand said bodies to final form in said molds and a timing device arranged to actuate all said means in a predetermined timed sequence.

11. In an apparatus for forming hollow plastic articles from heated plasticized material, said apparatus comprising in combination, a material plasticizing device adapted to continuously plasticize and extrude material under pressure and in workable form, a material distributing and control valve at the extrusion end of said extruder, said valve adapted to receive and feed the material to dispensing chambers disposed upon opposite sides of the said valve, each said chamber provided with a reciprocable nozzle and forming a mold charging station, mold carrying turrets disposed above each said station and arranged to support and move a series of molding units in succession to each said station, each said mold unit comprising a neck mold, a blow mold, a neck forming plunger and a blow head, said neck molds and said nozzles arranged to cooperate at each said charging station in alternation to form finished neck portions, means to move said nozzles away from said neck molds thereby forming extruded hollow tubular body portions of said workable material pendant from said neck portions, means to actuate said valve, means on each said turret to close said blow molds about said pendant tubular bodies, means to expand said bodies to final form in said molds and a timing device arranged to actuate all said means in a predetermined timed sequence.

12. In an apparatus for making plastic articles by shaping hollow tubular forms orificially extruded from heated bodies of plasticized material, said apparatus including means defining a plurality of material containing chambers, each said chamber being of variable volume and in communication with an extrusion orifice, each said chamber initially containing a body of said heated material in predetermined volume, injection molds having molding cavities and arranged to be seated upon and in register with the orifice of each said chamber, means within each said body arranged to inject material into each said mold cavity, means individual to each said body for causing relative linear displacement between the orifice therefor and the mold cavities to reduce the volume of each said chamber and body in alternation, such linear displacement causing the material under displacement pressure to issue from each said orifice in tubular form integral with the injected material, the rate of extrusion being coincident with the rate of application of said displacement pressure, means to continuously supply said heated material to each said chamber under plasticizing pressure and means to open and close the orifice of each said chamber in alternation.

13. In an apparatus for making a plastic article by blowing a tube extruded through an orifice, means defining a chamber of variable volume in communication with an extrusion orifice, said chamber containing a body of heated material in predetermined initial volume, an injection mold having a molding cavity arranged to seat upon and register with said orifice, means within said body arranged to inject material from said chamber into said cavity, means for linearly displacing said orifice with respect to said mold to reduce the volume of said chamber and to extrude said material simultaneously therefrom under displacement pressure and in tubular form integral with said injected material, the rate of said extrusion being coincident with the rate of application of said displacement pressure, means to continuously supply material under plasticizing pressure to said chamber and means to open and close said orifice.

14. The method of making a plastic article by a combined injection molding, extrusion and blowing process, wherein a finished portion only of an article is injection molded from plasticized material delivered from a body of such material of predetermined volume brought alternately into and out of communication with an injection mold, said method including the steps of moving an orifice and a mold into molding engagement while increasing the volume of the body of material, injecting material into the mold from said body to form said finished portion, causing further relative movement as between said orifice and mold while reducing the volume of said body and extruding material therefrom, and simultaneously subjecting said body to both continuous and intermittent pressures applied in opposition to each other during said extrusion operation.

15. In an apparatus for forming plastic articles, the combination comprising a body having a cavity, means for supplying material from a plasticizing source of supply to said cavity, a sleeve positioned in said cavity and movable axially relative thereto, a mandrel positioned within said sleeve and associated with said cavity to form an orifice, means interconnecting said mandrel and said sleeve so that they are moved outwardly out of said cavity when plastic material is supplied to said cavity, means for moving said sleeve relative to said mandrel, and means for moving said sleeve and said mandrel into said cavity to force the plastic material from said cavity through the cavity.

References Cited in the file of this patent
UNITED STATES PATENTS

| | | |
|---|---|---|
| Re. 24,784 | Sherman | Feb. 16, 1960 |
| 2,632,202 | Haines | Mar. 24, 1953 |
| 2,674,006 | Bailey | Apr. 6, 1954 |
| 2,724,860 | Strong | Nov. 29, 1955 |
| 2,871,516 | Sherman et al. | Feb. 3, 1959 |